United States Patent [19]

Manjiklan

[11] 3,909,279

[45] Sept. 30, 1975

[54] BONDING COMPOSITION

[75] Inventor: Serop Manjiklan, Del Mar, Calif.

[73] Assignee: The United States of America as represented by the Secretary of the Interior, Washington, D.C.

[22] Filed: July 5, 1974

[21] Appl. No.: 486,041

Related U.S. Application Data

[62] Division of Ser. No. 292,231, Oct. 3, 1972, abandoned.

[52] U.S. Cl. ................................. 106/180; 106/189
[51] Int. Cl.² ........................................... C08L 1/08
[58] Field of Search ................... 106/189, 196, 180

[56] References Cited

UNITED STATES PATENTS

| 2,165,499 | 7/1933 | Moss .................................. 106/180 |
| 2,389,940 | 11/1945 | Speicher ............................. 106/189 |
| 3,567,809 | 3/1971 | Ueno et al. ......................... 106/196 |

Primary Examiner—Theodore Morris
Attorney, Agent, or Firm—William S. Brown; Donald R. Fraser

[57] ABSTRACT

A composition for bonding semipermeable membranes, e.g., reverse osmosis membranes, comprising triacetin, propyl alcohol and cellulose acetate.

1 Claim, No Drawings

BONDING COMPOSITION

This is a division of application Ser. No. 292,231, filed Oct. 3, 1972 and now abandoned.

Reverse osmosis has attracted considerable interest in the field of purification of saline water. In this process, a pressure in excess of the osmotic pressure of the saline water feed solution is applied to the solution separated from purified water by a semipermeable membrane. Pure water is thereby caused to diffuse through the membrane, while the salt molecules or other impurities are retained by the membrane.

A wide variety of membrane materials have been used in reverse osmosis processes. Cellulose esters, in particular, have been extensively employed as membrane materials in reverse osmosis desalination processes. Cellulose acetate is generally preferred because of its availability and low cost. However, other esters, such as cellulose acetate butyrate, cellulose propionate, etc., have been used and may have advantageous properties for particular applications. Other polymeric organic materials, such as polyacrylic acid, polyamides, ethylene-vinyl acetate copolymers, polyaryl ethers, etc., have also been used as membrane materials in reverse osmosis processes.

The membranes are conventionally prepared by casting from a solution of the membrane material in an organic solvent and modifiers, usually followed by evaporation of solvent, gelation, heat treatment, or other suitable processing steps, depending on the particular membrane material.

In the reverse osmosis process, the membranes are usually employed as a film on a porous support, suitable support materials including materials such as porous glass, sintered metals, ceramics and organic polymeric materials such as homopolymers or mixed polymers of cellulose acetate, cellulose nitrate, styrene, vinyl butyral, etc. The film may be applied to the support in a variety of ways, such as in situ formation of the film on the support, casting of the film on the support, or application of the preformed membrane film to a preformed support.

The support material or the membrane-support composite may also be used in a variety of different forms, such as flat sheets, cylindrical tubes, hollow fibers, etc., depending on the particular type of apparatus used in the reverse osmosis process. Preparation of the membrane, or the composite, in the desired form often requires the use of a bonding agent for sealing edges or surfaces of the membrane to other portions of the membrane, or to other elements of the reverse osmosis apparatus. Typical of the use of such a bonding agent is for sealing of membrane edges in preparation of spirally wound of helically would reverse osmosis membranes. For this purpose, epoxy resins have been conventionally employed, as disclosed in U.S. Pat. Nos. 3,-417,870 and 3,367,504. However, these epoxy compositions have generally been deficient as to strength and durability, particularly for bonding wet membranes.

It has now been found that a bonding composition comprising triacetin, propyl alcohol and cellulose acetate is distinctly superior to the prior art bonding agents, particularly for bonding wet membranes. This composition has been found to be particularly useful for bonding overlapping edges of a strip of membrane film that is spirally of helically wound to form a tube.

The bonding agent of the invention operates as a precisely controlled solvent-plasticizer that dissolves and softens thin layers of membrane surfaces. When these surfaces are then brought into contact under pressure, the overlap or joint becomes a single unitary structure.

Triacetin, i.e., glycerol triacetate, is readily available commercially. It is a liquid at room temperature and is employed in the composition of the invention in an amount of about 44 to 98, preferably about 85 to 95, parts by volume. It is a slow acting and relatively weak solvent for most membrane materials, particularly for cellulose acetate.

Propyl alcohol, i.e., 1-propanol, is also a liquid and is used in the composition in an amount of about 5 to 50, preferably about 5 to 15, parts by volume. It serves as a diluent and solvating agent, and to control the solvating power of the triacetin.

Cellulose acetate, i.e., cellulose diacetate, is also readily available commercially, and generally has an acetyl content of about 38 to 40 percent. It is a solid at room temperature and is used in the composition of the invention in an amount of about 2 to 6 grams per 100 ml of the triacetin. Its function in the composition is largely that of controlling the viscosity of the composition for ease of application to the surface to be bonded. It thus makes possible a composition suited to mechanical or manual application using a variety of tools or devices. Optimum viscosity of the composition will vary with the specific use, but a viscosity of about 50 to 150 cp is generally suitable.

It has also been found that a dye may be readily incorporated in the composition of the invention. While not an essential element in the composition, the dye provides an accurate visual indication of the extent of the bond area. This is important, for example, to insure that a sealing bond of proper width and continuity is obtained. The dye may be any conventional coloring agent that is soluble in the bonding composition. Suitable dyes include (1) Solvi-Sol Bright Red TL, color index 26125, consisting of a reaction product of xyyylazoxylidine and 2-naphthol and (2) a scarlet dye, color index 12140, consisting of a reaction product of 2,4-xylidine and 2-naphthol, both available from Ingham Corporation. The optimum amount of dye will, of course, vary with the particular dye used, as well as the characteristics of the membranes to be bonded. However, amounts of about ¼ to 1 gm per liter of solution are usually satisfactory.

Compounding of the composition is readily accomplished by simply mixing the components by stirring or any conventional means, a substantially homogenous mixture being readily obtained at ambient conditions of temperature and pressure. The resulting mixture constitutes a solution that has substantially indefinite shelf life. In addition, it is much more efficient, easy to use and more reliable than conventional adhesives such as epoxies, which usually must be compounded shortly before use and have a limited shelf life.

Application of the composition to the surfaces to be bonded is also readily accomplished by conventional means such as brushing, use of roll-on discs, wicks, and controlled application through orifices, etc. Only moderate pressure is needed to effect an efficient seal, a pressure of about 0.1 to 1.0 psi generally being sufficient. As a rule, the pressure normally applied in forming the reverse osmosis membrane, or membrane composite, as, for example, in winding a strip of membrane film of a porous support tube to form a spirally-wound or helically-wound structure, is sufficient.

The composition of the invention also permits reduction of bonding time to a minimum, a period of about 10 to 20 seconds usually being sufficient. No extended setting time or curing period is required. In addition, bonding takes place readily at ambient temperature.

The bonded area resulting from use of the composition of the invention is of substantially the same chemical composition as the membrane and there is, therefore, no intervening adhesive layer of entirely different composition. As a result, the bond area is generally as resistant to environmental effects such as water pressure, chemical and bacteriological attack, corrosion, deformation, etc., as the membrane itself.

The invention will be more specifically illustrated by the following example.

EXAMPLE

A bonding composition was made by mixing the following ingredients:

| | |
|---|---|
| Triacetin | 94 ml. |
| Propyl alcohol | 6 ml. |
| Cellulose diacetate | 3 gm. |
| Solvi-Sol Bright Red TL | 1 gm. |

A membrane element was produced by helically winding a strip of cellulose acetate semipermeable membrane film around a porous support tube consisting of a perforated plastic tube overlaid with fabric. Contiguous edges of adjacent turns of the strip windings were overlapped three thirty-seconds inches, and between the surfaces at this overlap was laid a band one-sixteenth inch wide of the above bonding composition. The red band of bonding agent was readily visible between the overlapped membrane film areas. After a few moments the bond had set and the bond was tested for strength and seal. A tensile test showed that the bond was at least as strong as the adjoining membrane strip. Tests under water pressure showed no leaking through the bond area at 600 psi pressure and for a test period of three days. The bond obtained was essentially as good whether the membrane strip was wet or dry.

I claim:

1. A bonding composition consisting essentially of (1) about 85 to 95 parts by volume of triacetin, (2) about 5 to 15 parts of volume of propyl alcohol and (3) cellulose diacetate in an amount of about 2 to 6 grams per 100 ml of triacetin.

* * * * *